Figure 1:
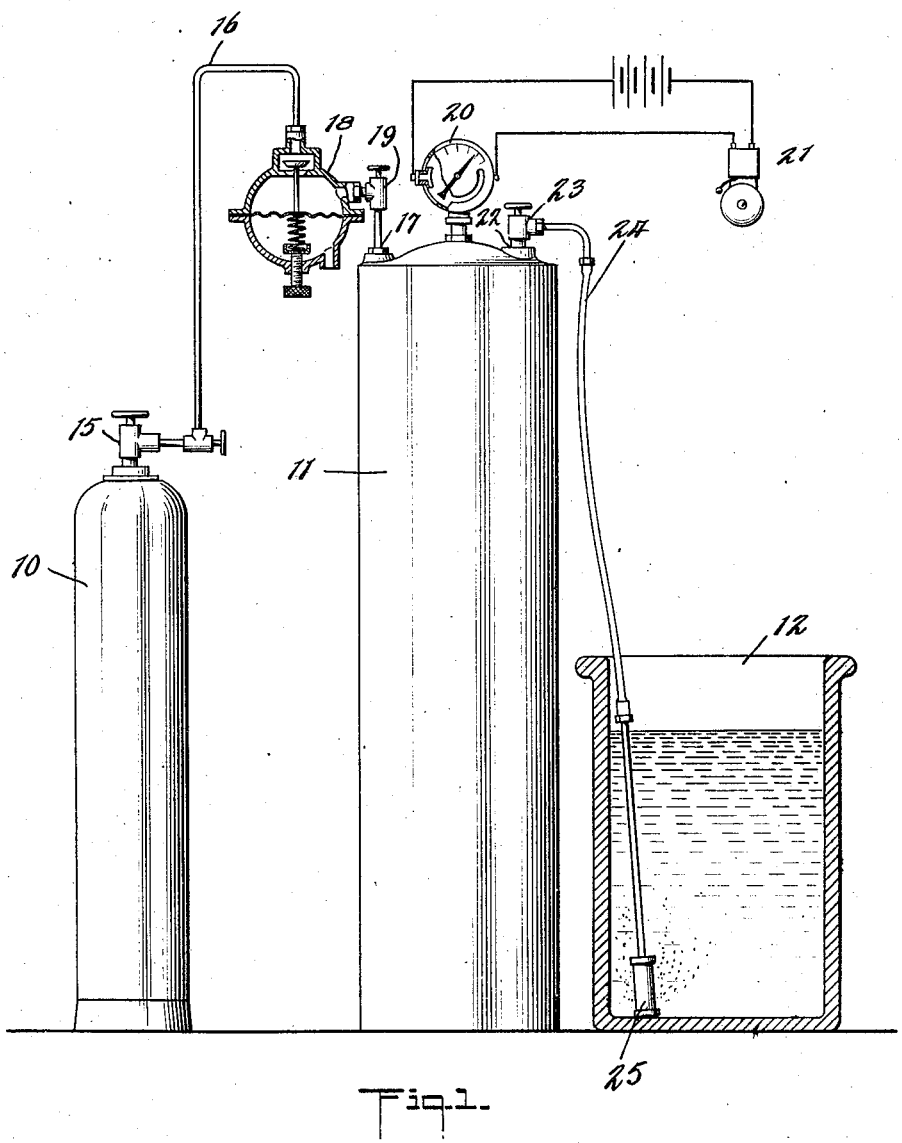

March 22, 1932. J. C. BAKER 1,850,975
METHOD OF MAKING HYPOCHLORITE SOLUTIONS
Filed April 11, 1927 3 Sheets-Sheet 1

INVENTOR.
John C. Baker
BY
his ATTORNEYS.

March 22, 1932.  J. C. BAKER  1,850,975
METHOD OF MAKING HYPOCHLORITE SOLUTIONS
Filed April 11, 1927  3 Sheets-Sheet 2
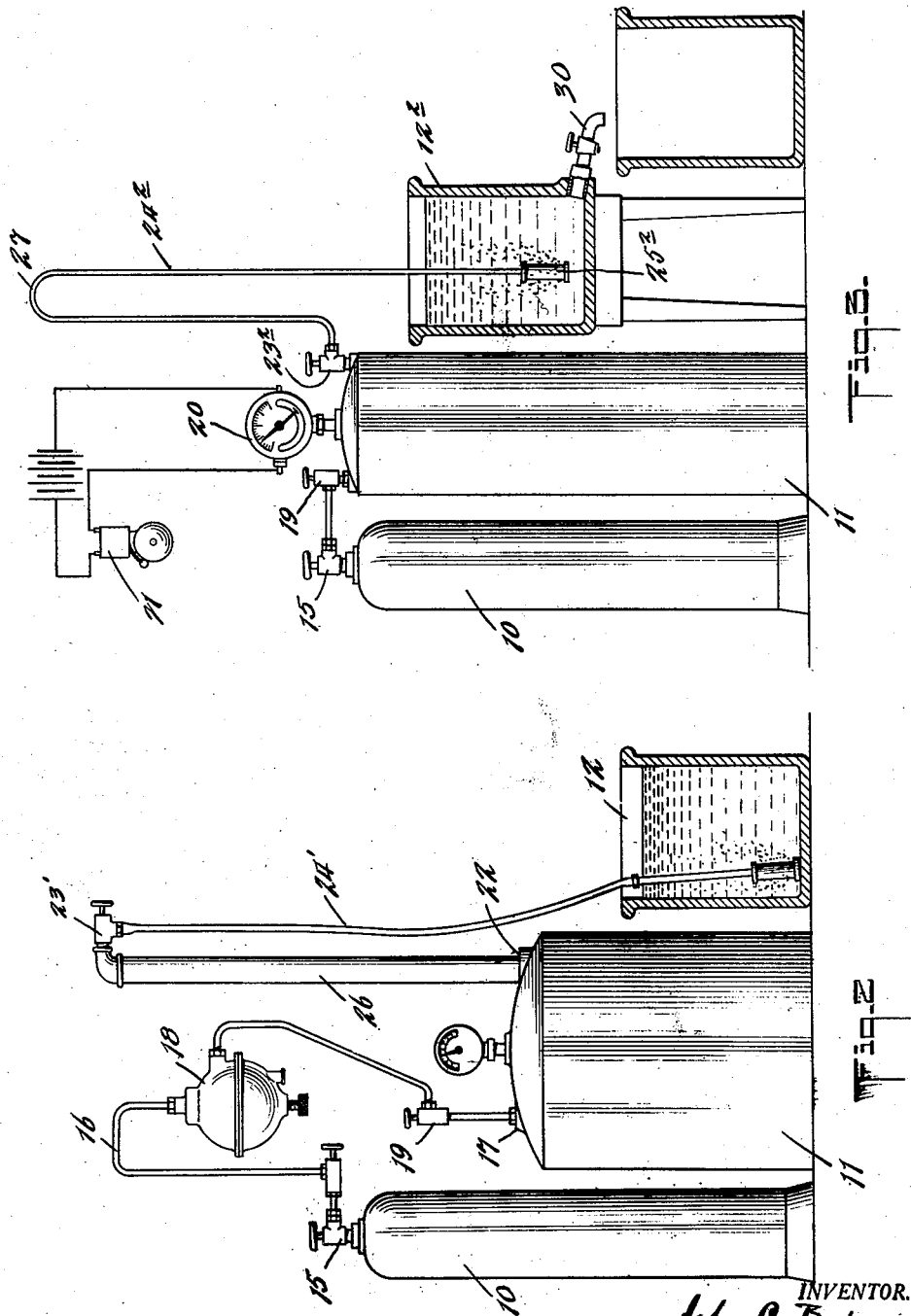

March 22, 1932.   J. C. BAKER   1,850,975
METHOD OF MAKING HYPOCHLORITE SOLUTIONS
Filed April 11, 1927   3 Sheets-Sheet 3

INVENTOR
John C. Baker
BY
Arthur A. Kent
his ATTORNEYS.

Patented Mar. 22, 1932

1,850,975

UNITED STATES PATENT OFFICE

JOHN C. BAKER, OF MONTCLAIR, NEW JERSEY, ASSIGNOR TO WALLACE & TIERNAN PRODUCTS, INC., OF BELLEVILLE, NEW JERSEY, A CORPORATION OF NEW JERSEY

METHOD OF MAKING HYPOCHLORITE SOLUTIONS

Application filed April 11, 1927. Serial No. 182,564.

The invention relates to a method of making hypochlorite solutions, and aims to provide an improved method by which accurately proportioned hypochlorite solutions may be produced without requiring expert attention, and which is especially adapted for production of the solutions in the establishments where they are to be used.

Hypochlorite solutions are extensively used as bleaching and sterilizing agents by laundries, dairies and other establishments. While various methods of making such solutions are in use, the most advantageous method consists in utilizing the reaction between chlorine and caustic soda. The difficulties encountered in making hypochlorite solutions in this way, due to the difficulties in handling both the chlorine and the caustic soda and properly combining them to produce a solution of the desired composition, that is, a solution containing the desired relative amounts of chlorine and alkali of the desired concentration, have been so great that laundries and other establishments have seldom attempted to make the solutions, but have purchased them ready made. This involves the expense of shipping large quantities of water. To reduce this expense, it has been customary to produce and ship concentrated solutions, usually 10% to 18% of chlorine, and this has led to further difficulties. Not only is the concentrated solution dangerous to handle, but it makes it practically necessary to make the solutions with a greater excess of alkali than would be necessary, even with the methods heretofore used, in making relatively weak solutions of suitable strength for use. Hypochlorite solutions are unstable if they contain uncombined chlorine, and in order to have the solutions stable it is customary to use a slight excess of alkali. The more concentrated the solution, the more unstable it is and the greater the excess of alkali required, so that it has generally been found necessary to have in commercial solutions of the usual concentration an amount of excess alkali which is sufficient to make the solution quite injurious to fabrics, and this has been a serious disadvantage in the use of hypochlorite solutions in laundries.

Many attempts have been made to provide a method and apparatus for making hypochlorite solutions which are suitable for use in laundries and other establishments where the solution is to be used, but the difficulties involved in handling the caustic soda or other strong alkali and chlorine gas and in obtaining the proper proportioning of these chemicals to produce the desired results have been so great, that up to the time of my invention it has proved impractical to manufacture hypochlorite solutions in small establishments. The present invention solves the problem. The invention provides a method which meets all the requirements of the small user, is free from operating difficulties, and makes it possible to produce at relatively low cost and without expert attention accurately proportioned hypochlorite solutions with a minimum excess of alkali, by delivering an accurately measured amount of chlorine gas to a solution containing a weighed amount of alkali.

My method comprises making the required solutions in small batches by first dissolving in water measured quantities of caustic soda or other strong alkali, that is, an alkali of sufficient strength to react with chlorine to form a stable hypochlorite solution, and then bubbling into the solution an accurately measured quantity of chlorine gas. The measuring of the chlorine and the introduction of the chlorine gas into the solution is accomplished by letting a measured amount of chlorine flow from a high pressure container, such as a container or tank of liquid chlorine, into a closed chamber, most desirably by letting the chlorine flow in gaseous form from the high pressure container into a closed expansion chamber of known volume, until a predetermined pressure less than the supply pressure is reached, and then using the pressure in the measuring chamber to cause the chlorine gas to flow from the chamber into the alkali solution. With an expansion chamber of any given volume, the predetermined pressure may be so proportioned to the measured amount of caustic soda or other alkali used in the water solution that the amount of chlorine gas which leaves the chamber as the pressure therein falls from the predetermined pressure to substantially atmospheric pressure will be just sufficient to combine with the caustic soda in the solution to form a neutral or slightly alkaline hypochlorite solution. Even if the chlorine is passed into the measuring chamber in liquid form, the chamber being of a size to contain the desired amount of liquid chlorine, a pressure indication may be used to show when the chamber is filled instead of measuring the chlorine by weight. Other features of my new method, directed particularly to the prevention of corrosion and preventing the escape of any chlorine gas, are hereinafter described.

A full understanding of the invention can best be given by a detailed description of apparatus for practicing the invention and its use, and such a description will now be given in connection with the accompanying drawings showing preferred forms of apparatus for carrying out the invention, and in which—

Figure 4:
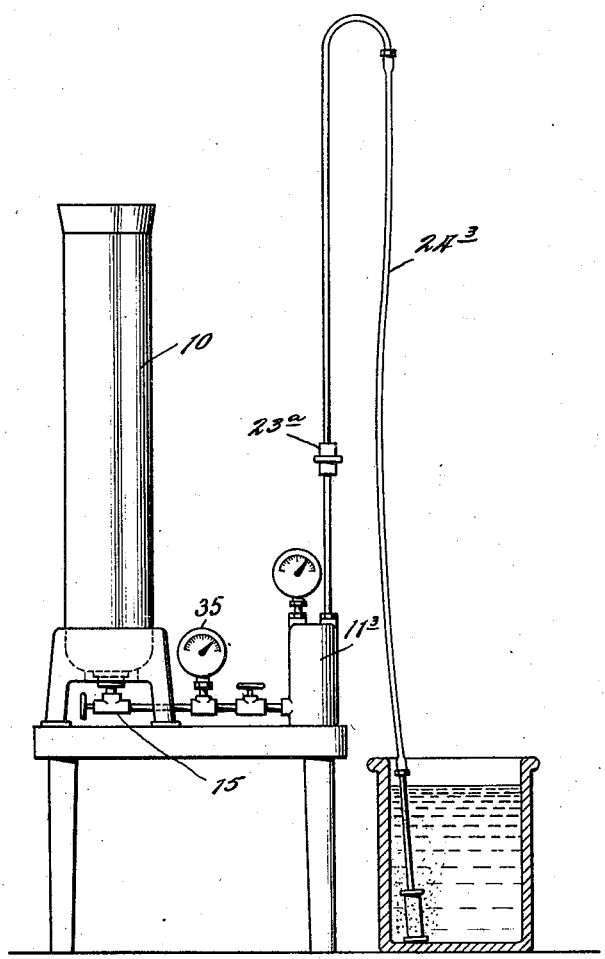

Fig. 1 is an elevation of an apparatus for making hypochlorite solutions according to my method, parts being shown in section and other parts diagrammatically, and Figs. 2, 3 and 4 are similar views of different modifications of the apparatus shown in Fig. 1.

Referring to the drawings, and first to Fig. 1, the apparatus illustrated in this figure includes a storage cylinder 10, an expansion tank 11, and a receptacle 12. The cylinder 10 is of the type in which liquid chlorine is ordinarily supplied under a pressure of about 100 lbs. per square inch. The expansion tank 11 may be an iron drum and is usually of a strength to withstand internal pressure up to about four atmospheres with a reasonable factor of safety. Its capacity must be accurately known. The receptacle 12 may be an open stoneware crock.

The outlet opening at the top of the cylinder 10, which is controlled by a shut-off valve 15, is connected by a pipe 16 to an inlet opening 17 in the tank 11. In the pipe 16 is inserted an adjustable pressure-controlled shut-off valve 18 which may be of usual construction and which serves to stop the flow of gas through the pipe 16 when the predetermined pressure for which the valve is set is reached in the tank 11. An emergency valve 19 which normally remains open is also desirably provided at the inlet opening 17. The tank 11 is provided with a pressure-indicating device for indicating, most desirably both visually and audibly, the reaching of the predetermined pressure for which the pressure-controlled valve is set. This device may consist of a pressure gauge 20 having a dial and pointer and having also electrical contacts connected in circuit with an electric bell 21, so that the bell rings when the predetermined pressure is reached. Obviously, the automatic pressure-controlled shut-off valve 18 may be omitted, in which case the operator will be depended on to stop the flow of gas to the tank by closing the valve 15 when the desired pressure is shown by the indicating device.

To an outlet opening 22, controlled by a shut-off and flow-controlling valve 23, and most desirably located at the top of the tank 11, is connected a pipe 24 which extends down into the receptacle 12 and has at its lower end a diffuser 25 located at or near the bottom of the receptacle. The diffuser 25 is provided with minute openings to permit the escape of the chlorine in the form of very small bubbles. A portion of the pipe 24 is made flexible to permit of transferring the diffuser from the receptacle 12 to a similar receptacle placed along side of it. It should be noted that the pipe 24 extends vertically upward from the diffuser 25 for a considerable distance. For reasons hereinafter explained, this distance is in practice usually made at least four feet.

Before the apparatus which has been described is placed in use for the first time, all air contained in the tank 11 is expelled and replaced by chlorine, as by opening the valves 15 and 23 until only chlorine gas comes out of the diffuser.

My new process for making hypochlorite solutions is carried out by means of the apparatus which has been described in the following manner:— A measured quantity of a suitable strong alkali, usually caustic soda for laundry purposes, is dissolved in water in the receptacle 12. The exact amount of water used is immaterial, the amount used depending on the desired concentration of the hypochlorite solution. The valve 23 is closed and the valve 15 is then opened to permit chlorine gas to flow from the cylinder 10 to the tank 11. When the predetermined pressure in the tank 11 for which the shut-off valve 18 is set is reached, the flow of chlorine to the tank is automatically shut off by this valve and the operator is notified that the desired pressure in the tank has been obtained by the ringing of the bell 21 or by the pointer on the indicator dial. As soon thereafter as he finds it convenient, or if the apparatus has no automatic shut-off valve, then immediately, the operator closes the valve 15. The valve 23 is then opened to permit chlorine gas to flow from the tank through the pipe 24 to the diffuser 25 from which the gas bubbles up in the solution in the container 12 and reacts with the dissolved caustic soda or other alkali. Because of the fineness of the holes in the diffuser and the depth of the liquid in the container 12, no chlorine escapes from the surface of the liquid unless the rate of flow through the pipe 24 should be too great. The rate of flow is adjusted by the valve 23, which provides an adjustable flow-controlling orifice. The flow of chlorine from the tank into the solution continues until the pressure within the tank has fallen substantially to atmospheric pressure. Actually, the flow of gas ceases when the pressure within the tank is equal to the hydrostatic head of the liquid in the container 12 above the diffuser. This completes the making of a batch of hypochlorite solution in the container 12. The diffuser 25 may then be transferred whenever desired to another container similar to the container 12, in which another batch of caustic soda or other alkali solution has been prepared. The valve 23, unless made of material non-corrodible by chlorine, should normally be left open and closed only for filling the tank. Valves of non-corrodible material are too costly for general use.

The process may be repeated as desired, an equal quantity of alkali being dissolved in a suitable amount of water each time. The result will be the production of successive batches of hypochlorite solution, all having very closely the same chemical composition. The strength of the solution may, of course, be varied by varying the amount of water used. If it is desired to produce a larger or smaller amount of hypochlorite solution of any desired strength, this can be done by dissolving a different amount of alkali and measuring a corresponding amount of chlorine gas into the tank 11 by suitably setting the indicating device and the automatic shut-off valve also, if the apparatus is provided with such valve. If the apparatus is intended to be used for making different amounts of hypochlorite solution at a time, the pressure gauge may conveniently be marked to indicate the amount of alkali to be used for different amounts of chlorine gas measured into the tank as indicated by the gauge. Usually, however, the apparatus will be used for producing successive batches of a solution containing the same amount of hypochlorite.

The apparatus may be initially adjusted so as to produce a solution of just the chemical composition required, using a predetermined amount of caustic soda or such other strong alkali as is to be used. For laundry use it is usually desirable that the solution shall be either neutral or slightly alkaline. In order to produce such a solution, the predetermined pressure for which the valve 18 and the indicating device are set is made such that the amount of chlorine gas contained in the tank 11 at the predetermined pressure exceeds the amount contained in the tank under substantially atmospheric pressure by an amount sufficient, or just slightly less than sufficient, according to whether the solution is to be neutral or slightly alkaline, to react with the measured quantity of alkali dissolved in the container 12. Variations in the room temperature will, of course, necessitate corresponding slight adjustment of the valve 18 and indicating device. To obtain a slightly alkaline solution of sodium hypochlorite, the ratio between the weights of the chlorine and the caustic soda of 76% sodium oxide used should be 5 to 6.

The time required to fill the tank to the desired pressure may be two or three minutes, while that required for the flow of the chlorine gas from the tank into the solution is usually twenty minutes or longer. Although the cessation of the flow from the tank is indicated by an absence of bubbles from the diffuser 25 and by a falling of the pressure gauge 20 to substantially atmospheric pressure indication, it has been found impossible to rely on laundry employees to remove the diffuser from the container promptly when the flow ceases. If, as is usually the case, the diffuser be left in the solution after the flow of gas through it has stopped, chlorine gas remaining in the pipe 24 dissolves in the solution, causing a reduction of pressure in the tank and pipe, or in the pipe alone if the valve 23 should be closed, which results in the liquid rising in the pipe; and additional rising of the liquid in the pipe is frequently caused by changes in pressure in the tank due to changes in room temperature, which in a laundry may ordinarily be as great as 20° C. between day and night. Although the valve 23 and the tank 11 are not injured by anhydrous chlorine, they would be quickly corroded and ruined if any watery liquid came in contact with them in the presence of the chlorine. It is, therefore, important to the practical success of the apparatus that means be provided for preventing liquid from the container 12 from entering the tank 11 or reaching the valve 23 when the diffuser is left in the liquid after the flow of gas has stopped.

I have ascertained that if the pipe 24 be made of very small diameter in comparison with the capacity of the tank 11, for example of ¼″ internal diameter when the tank has a capacity of one cubic foot, the extent to which the liquid will rise in the pipe as a result of pressure reduction in the tank due to the dissolving of chlorine gas in the liquid in the pipe is not over about two feet, as before this point is reached the rise is stopped by the liquid in the pipe becoming saturated with chlorine. The rise of the liquid due to change in pressure in the tank resulting from change in temperature in the room will not ordinarily exceed about two feet. A four foot rise of the pipe 24 from the diffuser to its high point, the valve 23 being at or beyond such high point will, therefore, under the conditions stated, afford fairly safe protection of the valve 23 and tank 11 from access of liquid from the container. An important feature of my invention consists in preventing the liquid from reaching the tank or the valve by so arranging the pipe 24 that some point of it is located at a level sufficiently above the diffuser to prevent liquid from the receptacle rising in the pipe to such point because of change in pressure in the measuring tank resulting from absorption of chlorine gas by liquid in the pipe or from change in room temperature after flow of gas from the measuring tank has ceased; or, in other words, by causing the gas in passing from the tank 11 into the liquid to flow downward through a sufficient height so that decrease in pressure in the tank due to room temperature change or to absorption of gas by solution in the pipe 24 after the gas flow has ceased will be counterbalanced by the hydrostatic head produced in the pipe; and as stated above I find that with a ¼ inch discharge pipe and a tank of one cubic foot capacity such high point of the pipe should be at least four feet above its discharge end, and in practice I consider it best for complete protection of the apparatus to extend this distance somewhat even when the tank is relatively larger, as in the apparatus of Fig. 1. Apparatus according to the invention for laundry use has generally been made with a measuring tank of fifty gallons, or about 6.7 cubic feet capacity and a ¼ inch discharge pipe. This distance from the discharge end of the pipe to its high point should be greater if the ratio between the capacity of the tank and the size of the pipe is smaller, and may be less if this ratio is larger. It is also desirable that between this high point of the pipe and the diffuser the pipe 24 should be as nearly as possible vertical in order that the smallest possible area of liquid may be exposed to the chlorine within the pipe.

With this arrangement of the pipe 24, an advantage is gained by delaying the transfer of the diffuser from one container to another until after absorption of the chlorine has permitted the solution to rise in the pipe at least to an extent sufficient to fill the diffuser. After this has occurred, the transfer of the diffuser from one container to another may be made without danger of the escape of any chlorine gas, since no substantial part of the liquid in the diffuser will escape during such transfer and this liquid serves to prevent the escape of chlorine gas. The diffuser may, however, be immediately transferred with only slight escape of chlorine if done quickly.

In the arrangement shown in Fig. 1, the necessary drop in the pipe 24 is obtained by placing the valve 23 at the top of the tank 11 and extending the pipe directly downward from this valve to the bottom of the container. This arrangement is suitable when a sufficiently high tank is used or when the tank is set on a sufficiently elevated support. If the top of the tank is not sufficiently above the container, as in the case of the tank 11' shown in Fig. 2, the desired drop in the pipe 24 may be obtained by providing the tank with a vertical standpipe 26 from the top of which the gas discharge pipe 24' extends downwardly as before, the standpipe being of sufficient length to obtain the necessary drop in the pipe 24'. The shut-off valve 23' may be located at the top of the standpipe as shown, or at any point between the high point of the discharge pipe and the tank. An alternative arrangement of the discharge pipe from a tank the top of which is not sufficiently elevated to permit of having the pipe extend directly downward from the top of the tank is shown in Fig. 3 where the shut-off valve $23^2$ is at the top of the tank and the pipe $24^2$ is extended upwardly to a point 27 located at the desired height above the diffuser $25^2$, the high point 27 of the pipe being between the diffuser and the shut-off valve.

The apparatus shown in Fig. 2 differs from that shown in Fig. 1 also in having only visual pressure-indicating means, while the arrangement shown in Fig. 3 differs from that shown in Fig. 1 in that the pressure-controlled valve 18 is omitted. The arrangement shown in Fig. 2 is satisfactory in practice, and if desired the apparatus may further be simplified by omitting the pressure-indicating means altogether, since no harm can result from delay of the operator in closing the valve 15 and opening the valve 23 after the automatically operating valve 18 has closed. The arrangement shown in Fig. 3 is satisfactory in cases where the operator can be relied upon for sufficient attention to close the valve 15 when the bell rings.

Instead of making the hypochlorite solution in movable receptacles which are successively placed in and removed from position, the diffuser and lower end of the gas pipe 24 being transferred from the receptacle in which a batch of solution has been made to another receptacle for the making of another batch, successive batches of hypochlorite solution may be made in a receptacle which is suitably mounted and provided with a faucet or valved outlet for running off the made solution into any desired container for use or transportation. This avoids the necessity of making any part of pipe 24 flexible. Such an arrangement is shown in Fig. 3 which shows a receptacle $12^2$ to be used for making successive batches of solution and which is provided at its bottom with a faucet 30 and is set on an elevated support so that the solution may be drawn off through the faucet into any desired containers positioned beneath the faucet as shown. The gas discharge pipe $24^2$ may be rigid throughout its length.

Fig. 4 shows an apparatus in which the chlorine is measured in the liquid form. A small measuring tank 11³ of a size to hold just the desired amount of liquid chlorine is used, and the supply cylinder of liquid chlorine is inverted so that the discharge valve 15 is at the bottom. When the valve 15 is opened, the gas discharge line being open, liquid chlorine is forced into the measuring tank. The measuring tank is provided with a pressure gauge which will indicate when the tank is filled by showing the full cylinder pressure shown by a cylinder pressure gauge 35. The valve 15 is then closed and the chlorine is discharged from the tank in gaseous form through the pipe 24³ into the solution in the receptacle as before described. The gas discharge pipe 24³ is arranged as before to extend downward a sufficient distance from its high point to its discharge end in the solution to guard against trouble from solution rising in the pipe, the size of the pipe and the extent of its drop being proportioned to the very small capacity of the tank 11³.

As shown in this figure, the gas discharge pipe 24³, instead of having a shut-off valve, is provided with a small fixed flow-controlling orifice provided by a fitting 23ª. The orifice being always open, a small amount of chlorine will flow through the orifice and into the solution during the filling of the measuring tank, but the orifice is made very small so that this amount will be almost negligible and may be readily compensated for by slightly increasing the amount of alkali put into the solution or slightly decreasing the amount of chlorine measured into the tank. Obviously, such a small fixed flow-controlling orifice might equally well be used in place of the shut-off valve 23 in apparatus having an expansion tank in with the chlorine is measured in gaseous form, as illustrated in Figs. 1, 2 and 3. It is generally best to provide the valve, however, as it not only serves for stopping the outflow of gas while the measuring tank is being filled, but it also provides an adjustable flow-controlling orifice whereby the rate of gas discharge may be regulated to secure as rapid discharge of the gas as possible without having gas escape from the surface of the liquid in the solution container, and to compensate for variations in diffusers. If an adjustable flow-controlling orifice is not provided for adjustably restricting the flow through the pipe 24, then it is best to provide a fixed flow-controlling orifice of suitable size rather than to depend on the diffuser to properly limit the outflow of gas reaching it under the full measuring tank pressure, since a diffuser may then be used having orifices somewhat larger than would otherwise be required, and the pressure in the flexible portion of the pipe 24 is reduced.

What I claim is:

1. The method of making hypochlorite solutions of desired composition, which comprises dissolving a measured quantity of strong alkali in a body of water, withdrawing a predetermined quantity of chlorine gas from a supply of liquid chlorine into a gas measuring chamber, and permitting such measured quantity of chlorine to flow in gaseous form slowly into the water solution of alkali.

2. The method of making a hypochlorite solution of desired composition, which comprises dissolving a measured quantity of a strong alkali in water, permitting anhydrous chlorine gas supplied under pressure to flow into a closed expansion chamber, stopping the flow of chlorine gas into said chamber when the pressure therein reaches a predetermined point, which indicates the presence in the chamber of the amount of chlorine gas which the chamber will hold at atmospheric pressure plus an amount just sufficient to react with said measured quantity of alkali to form a hypochlorite solution of the desired composition, and thereafter permitting the chlorine gas to flow slowly from the chamber into the water solution of alkali until the flow ceases because of the fall of pressure within the chamber substantially to atmospheric pressure.

3. The method of making a hypochlorite solution of desired composition, which comprises dissolving a measured quantity of strong alkali in water, permitting anhydrous chlorine gas supplied under pressure to flow into a closed expansion chamber, stopping the flow of chlorine gas into said chamber when the pressure therein reaches a predetermined point which indicates the presence in the chamber of the amount of chlorine gas which the chamber will hold at atmospheric pressure plus an amount just sufficient to react with said measured quantity of alkali to form an approximately neutral hypochlorite solution, thereafter permitting the chlorine gas to flow from the chamber into the water solution of alkali until the flow ceases because of the fall of pressure within the chamber substantially to atmospheric pressure, and preventing the solution from entering the chamber after the flow of gas has stopped.

4. The method of making a hypochlorite solution of desired composition, which comprises dissolving a measured quantity of strong alkali in water in an open receptacle, withdrawing a predetermined quantity of chlorine from a supply of liquid chlorine into a measuring chamber, thereafter permitting chlorine gas to flow from the chamber into the water solution in the receptacle through a downwardly directed pipe extending substantially to the bottom of the receptacle and having a diffuser connected to the end thereof, permitting said pipe to remain in the receptacle after the flow of gas has ceased until the absorption of gas in the pipe has permitted the solution to rise in the lower end of the pipe, and then transferring the pipe to another receptacle and immersing its lower end and the diffuser in liquid contained therein.

5. The method of making hypochlorite solutions of desired composition, which comprises dissolving a measured quantity of strong alkali in a body of water, withdrawing from a supply of liquid chlorine into a measuring chamber a quantity of chlorine such that the amount of chlorine in the chamber will be that which the chamber will hold at atmospheric pressure plus an amount just sufficient to react with said measured quantity of alkali to form a hypochlorite solution of the desired composition, and permitting chlorine gas to flow slowly from the chamber into the water solution of alkali until the flow ceases because of the fall of pressure within the chamber substantially to atmospheric pressure.

6. The method of making hypochlorite solutions of desired composition, which comprises dissolving a measured quantity of strong alkali in a body of water to form a solution of the alkali, supplying chlorine gas to an expansion chamber and cutting off the supply when a predetermined pressure is reached in the chamber, and bubbling into said solution of alkali the gas thus trapped in the expansion chamber.

7. The method of making hypochlorite solutions of desired composition, which comprises dissolving a measured quantity of strong alkali in a body of water to form a solution of alkali, supplying chlorine to a measuring chamber and cutting off the supply when the pressure attained in the chamber indicates the presence of a predetermined quantity of chlorine therein, and bubbling into said solution of alkali the chlorine thus trapped in the measuring chamber.

8. The method of making hypochlorite solutions of desired composition, which comprises dissolving a measured quantity of strong alkali in water, permitting chlorine gas to flow from a measuring chamber containing a predetermined quantity of chlorine in excess of that which the chamber will hold at atmospheric pressure into the water solution of alkali until the flow ceases because of the fall of pressure within the chamber substantially to atmospheric pressure, and providing a hydrostatic head to prevent the solution from entering the measuring chamber after the flow of gas has stopped.

9. The method of making a hypochlorite solution of desired composition, which comprises dissolving a measured quantity of a strong alkali in a body of water, passing into a measuring chamber a predetermined quantity of chlorine in excess of that which the chamber will hold at atmospheric pressure, thereafter permitting chlorine gas to flow slowly from the chamber into the water solution of alkali until the flow ceases because of the fall of pressure within the chamber substantially to atmospheric pressure, and preventing the solution from being drawn into the chamber by pressure reduction therein after the flow of gas therefrom has stopped by causing the flow of the chlorine gas from the chamber into the solution to be through a pipe of small bore extending downward into the solution.

10. The method of making a hypochlorite solution of desired composition, which comprises dissolving a measured quantity of strong alkali in a body of water, passing into a measuring chamber a predetermined quantity of chlorine in excess of that which the chamber will hold at atmospheric pressure, thereafter permitting chlorine gas to flow slowly from the chamber into the water solution of alkali until the flow ceases because of the fall of pressure within the chamber substantially to atmospheric pressure, and preventing the solution from being drawn into the chamber by pressure reduction therein after the flow of gas therefrom has stopped by causing the gas to flow in a downward direction between the chamber and the solution through a sufficient height so that decrease in pressure in the chamber due to room temperature change or absorption of gas by solution in the flow passage will be counter-balanced by the hydrostatic head produced by the downward passage.

In testimony whereof I have hereunto set my hand.

JOHN C. BAKER.